US011060938B2

United States Patent
Gao et al.

(10) Patent No.: US 11,060,938 B2
(45) Date of Patent: Jul. 13, 2021

(54) DUAL-PURPOSE CALIBRATION SYSTEM FOR OPTICAL PRESSURE SENSITIVE PAINT CONSIDERING STATIC AND SINUSOIDAL PRESSURE CHANGES, AND CALIBRATION METHOD

(71) Applicant: NORTHWESTERN POLYTECHNICAL UNIVERSITY, Shaanxi (CN)

(72) Inventors: Limin Gao, Shaanxi (CN); Heng Jiang, Shaanxi (CN); Ning Ge, Shaanxi (CN); Tianyu Gao, Shaanxi (CN); Guanhua Yang, Shaanxi (CN)

(73) Assignee: NORTHWESTERN POLYTECHNICAL UNIVERSITY, Shaanxi (CN)

( * ) Notice: Subject to any disclaimer, the term of this patent is extended or adjusted under 35 U.S.C. 154(b) by 0 days.

(21) Appl. No.: 16/866,558

(22) Filed: May 5, 2020

(65) Prior Publication Data
US 2020/0348201 A1    Nov. 5, 2020

(30) Foreign Application Priority Data
May 5, 2019    (CN) .......................... 201910367419.3

(51) Int. Cl.
*G01L 27/00*    (2006.01)
*G01L 1/24*    (2006.01)
(52) U.S. Cl.
CPC .............. *G01L 27/005* (2013.01); *G01L 1/24* (2013.01)

(58) Field of Classification Search
CPC ............................... G01L 27/005; G01L 1/24
See application file for complete search history.

(56) References Cited

FOREIGN PATENT DOCUMENTS

| CN | 1279756 | 1/2001 |
|---|---|---|
| CN | 102135122 | 7/2011 |
| CN | 106872100 | 6/2017 |
| CN | 106872100 A  * | 6/2017 |
| CN | 109269720 | 1/2019 |

(Continued)

OTHER PUBLICATIONS

Ruiyu Li, et al., "Experimental investigation on static/dynamic characteristics of a fast-response pressure sensitive paint", Chinese Journal of Aeronautics, Apr. 12, 2018, pp. 1198-1205.

(Continued)

*Primary Examiner* — Ryan D Walsh
(74) *Attorney, Agent, or Firm* — JCIP Global Inc.

(57) ABSTRACT

A dual-purpose calibration system for an optical pressure sensitive paint considering static and sinusoidal pressure changes, and a calibration method, in which a dual-purpose calibration tube is used in common, are provided. In the dual-purpose calibration system, a dynamic adapter and a static adapter are replaced with each other to achieve switching between dynamic calibration and static calibration, so that two calibration methods, one static and the other dynamic, can be implemented by the dual-purpose calibration system. The switching between the dynamic calibration and the static calibration includes changing between the dynamic adapter and static adapter, and setting a sound source corresponding to the dynamic adapter or setting a gas source corresponding to the static adapter.

9 Claims, 9 Drawing Sheets

(56) References Cited

FOREIGN PATENT DOCUMENTS

CN   109269720 A  *  1/2019
CN   110146220       8/2019

OTHER PUBLICATIONS

Hirotaka Sakaue, et al., "Time Response of Anodized Aluminum Pressure-Sensitive Paint", AIAA Journal, Oct. 2001, pp. 1-9.
Tamao Sugimoto, et al., "Characterization of Frequency Response of Pressure-Sensitive Paints", AIAA Journal, Apr. 2017, pp. 1460-1464.
Gao Limin, et al., "Experimental research on dynamic and static characteristics of fast response pressure sensitive coatings", 2015 Chinese Academy of Engineering Thermophysics Pneumatics Annual Conference, May 2015, submit with English abstract, pp. 1-8.

* cited by examiner

DUAL-PURPOSE CALIBRATION SYSTEM FOR OPTICAL PRESSURE SENSITIVE PAINT CONSIDERING STATIC AND SINUSOIDAL PRESSURE CHANGES, AND CALIBRATION METHOD

CROSS-REFERENCE TO RELATED APPLICATION

This application claims the priority benefit of China application serial no. 201910367419.3, filed on May 5, 2019. The entirety of the above-mentioned patent application is hereby incorporated by reference herein and made a part of this specification.

FIELD

The present disclosure relates to the technical field of pressure calibration of optical pressure sensitive paints, and particularly relates to a dual-purpose calibration system for an optical pressure sensitive paint considering static and sinusoidal pressure changes, and a calibration method.

BACKGROUND

As one of the three thermal parameters (pressure, temperature and flow) of automatic control, pressure plays a very important role in measurement and control. There are many approaches to pressure measurement, but none of them can make it without calibration of measurement equipment to obtain measurement data, such as a functional relationship between an electrical signal, an optical signal or the like, and pressure, and characteristics such as sensitivity of a measurement system.

As the newest optical pressure measurement technology at present, pressure measurement by using an optical pressure sensitive paint (PSP) is favored by many experimental workers due to its advantages of no interference with the flow field during pressure measurement, a low experimental cost, capability of global measurement, etc.

The principle of PSP pressure measurement is based on the principle of photoluminescence and oxygen quenching. That is, under ultraviolet illumination of a certain wavelength, photosensitive molecules in the paint obtain energy from a ground state and jump up to an excited state, and return to the ground state, in which process the molecules emit excited light. However, after colliding with oxygen molecules, the photosensitive molecules do not emit fluorescence when returning to the ground state. As the concentration of oxygen molecules is different at different pressures, the intensity of the excited light has a certain relationship with pressure. In other words, during the measurement, a light path needs to be designed to provide ultraviolet illumination, and a pressure value is obtained by acquiring an optical signal of the excited light.

Similarly, this PSP pressure measurement method also needs calibration, whose results can provide a reference for the applications and development of an optical pressure sensitive paint. Calibration includes static calibration and dynamic calibration. The purpose of static calibration is to obtain static characteristic parameters of the PSP, including a static calibration relationship, repeatability, hysteresis, sensitivity, etc. In practical applications, it is rare to measure an absolute static pressure, and a static calibration result is different from a dynamic calibration result. In order to make a pressure measurement device provide a more accurate test result, dynamical calibration is required. That is, in addition to a quantitative relationship between a signal and pressure, it also needs to obtain a signal-to-time response relationship.

In respect of PSP calibration at present, there is a problem of incompatibility between dynamic and static calibration modes; that is, it is impossible to use a set of equipment to obtain high-precision static and dynamic characteristic parameters of an optical pressure sensitive paint while taking into account the influence of temperature.

SUMMARY

A technical problem to be solved by the present disclosure is providing a dual-purpose calibration system for an optical pressure sensitive paint considering static and sinusoidal pressure changes and a calibration method, capable of supporting a static calibration mode and a sinusoidal dynamic calibration mode.

To solve the aforementioned technical problem, the present disclosure adopts the following technical solution: a dual-purpose calibration system for an optical pressure sensitive paint considering static and sinusoidal pressure changes includes:

a dual-purpose calibration tube, including a hollow tubular main body section, which is arranged at the bottom with a bottom cap in sealed connection with the main body section, the bottom cap being provided with a calibration sample located inside the main body section, the calibration sample being coated with an optical pressure sensitive paint, the bottom cap being also provided with a pressure transducer for detecting the pressure in the main body section and a temperature transducer for measuring the temperature of the optical pressure sensitive paint, and the bottom cap being sleeved with a heating device outside; and the main body section being provided with two transparent windows laterally;

a sound source, configured to provide a dynamic pressure in the form of a sound wave during a dynamic calibration mode;

a dynamic adapter, configured for sealed connection between the sound source and a front portion of the main body section during the dynamic calibration mode, the main body section and the dynamic adapter forming a standing wave tube with a total length that allows the sound wave emitted by the sound source to form a standing wave in the standing wave tube;

a gas source, configured to supply gas during a static calibration mode;

a static adapter, configured for sealed connection between the gas source and the front portion of the main body section during the static calibration mode, so that the gas provided by the gas source is introduced into the dual-purpose calibration tube to form a pressure;

a laser source, configured to emit laser during the dynamic calibration mode and the static calibration mode, and irradiate the laser on the calibration sample through one of the transparent windows, so that the optical pressure sensitive paint on the calibration sample generates excited light;

a photoelectric conversion unit, configured to receive the excited light from the other transparent window during the dynamic calibration mode and the static calibration mode respectively, and convert the excited light into an electrical signal; and a controller, configured to acquire a real-time pressure in the dual-purpose calibration tube through the pressure transducer, identify the intensity of the excited light of the optical pressure sensitive paint through the photoelectric conversion unit, control the change of the frequency of the sound source and the heating degree of the heating device during the dynamic calibration mode, and control the amount of gas provided by the gas source and the heating degree of the heating device during the static calibration mode, to obtain the intensity of the excited light under different working conditions.

A calibration method implemented by using the dual-purpose optical pressure sensitive paint calibration system includes:

adjusting the positional relationship between the laser source and the dual-purpose calibration tube and the positional relationship between the photoelectric conversion unit and the dual-purpose calibration tube, respectively, so that the laser emitted by the laser source is irradiated on the calibration sample through one of the transparent windows, and the optical pressure sensitive paint on the calibration sample generates excited light; and the photoelectric conversion unit receives the excited light from the other transparent window;

during a dynamic calibration, changing the frequency of the sound source and the heating degree of the heating device to acquire the intensity of the excited light under different working condition combinations, and comparing results obtained by the photoelectric conversion unit and the pressure transducer at different sound source frequencies and temperatures to achieve the dynamic calibration of the optical pressure sensitive paint by the controller;

during a static calibration, controlling the amount of gas provided by the gas source and the heating degree of the heating device to obtain the intensity of the excited light under different working conditions, and comparing results obtained by the photoelectric conversion unit and the pressure transducer at different pressures and temperatures to achieve the static calibration of the optical pressure sensitive paint by the controller; and switching between the dynamic calibration and the static calibration includes changing between the dynamic adapter and the static adapter, and setting the sound source corresponding to the dynamic adapter or setting the gas source corresponding to the static adapter.

The present disclosure has the beneficial effects that the dynamic adapter and the static adapter are replaced with each other to achieve switching between the dynamic calibration and the static calibration, so that the system can implement two calibration methods, one static and the other dynamic; and a temperature parameter is added, thereby achieving negative feedback regulation of the surface temperature of the paint.

DETAILED DESCRIPTION OF THE EMBODIMENTS

The present disclosure is further described below with reference to specific examples and drawings.

The present disclosure provides a dual-purpose calibration system for an optical pressure sensitive paint considering static and sinusoidal pressure changes, as shown in FIGS. 1 to 9, including a dual-purpose calibration tube, a sound source, dynamic adapter, a gas source, a static adapter, a laser source, a photoelectric conversion unit, and a controller.

Figure 3:
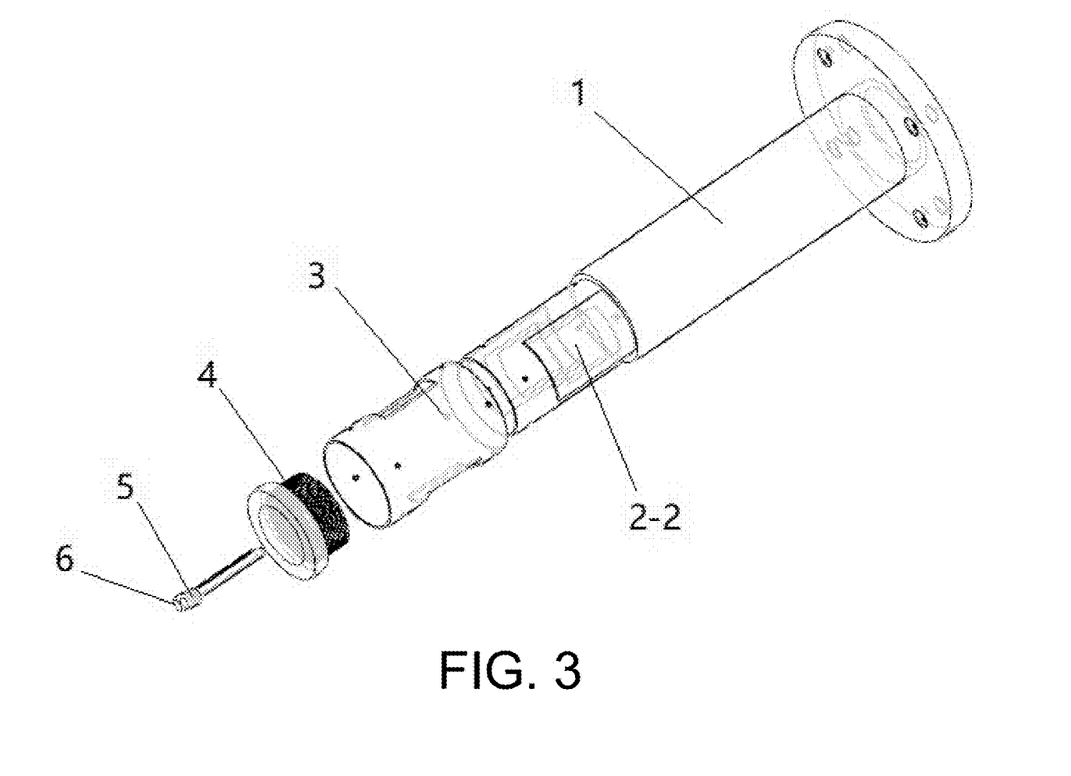
FIG. 3 is an exploded view of a dual-purpose calibration tube.
Figure 4:
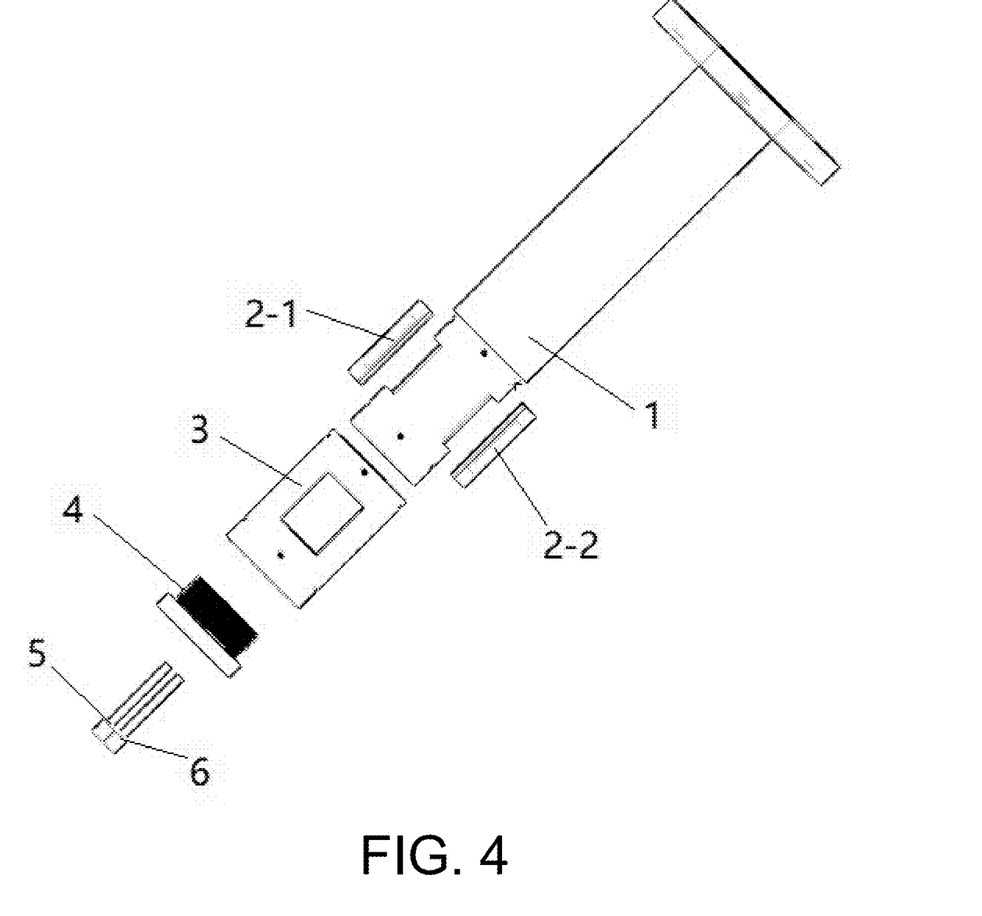
FIG. 4 is an exploded sectional view of FIG. 3.
Figure 5:
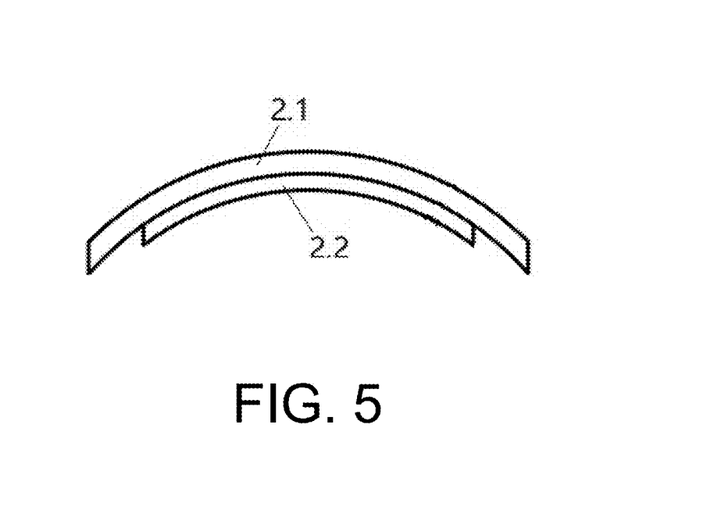
FIG. 5 is a sectional view of a transparent window.

The dual-purpose calibration tube includes a hollow tubular main body section 1, which is arranged at the bottom with a bottom cap 4 in sealed connection with the main body section 1. The bottom cap 4 is provided with a calibration sample 14 located inside the main body section 1, the calibration sample 14 is coated with an optical pressure sensitive paint, the bottom cap 4 is also provided with a pressure transducer 5 for detecting the pressure in the main body section 1 and a temperature transducer 6 for measuring the temperature of the optical pressure sensitive paint, and the bottom cap 4 is sleeved with a heating device 13 outside. The main body section 1 is g provided with two transparent windows laterally, namely a first transparent window 2-1 and a second transparent window 2-2. In this embodiment, the transparent windows are in a double-crescent shape, and the main body section 1 is sleeved with a window cover ring 3 outside, wherein the double-crescent shape is composed of an outer large crescent 2.1 and an inner small crescent 2.2 which are integrally processed into one piece, the small crescent 2.2 is in interference fit with a window hole on the main body section 1, and the large crescent 2.1 is embedded between the main body section 1 and the window cover ring 3 for fixing the same. The window cover ring 3 is provided with a cover ring hole aligned with the window hole on the main body section 1. The material of the transparent window is quartz glass to adapt to the optical band of the optical pressure sensitive paint.

Figure 1:
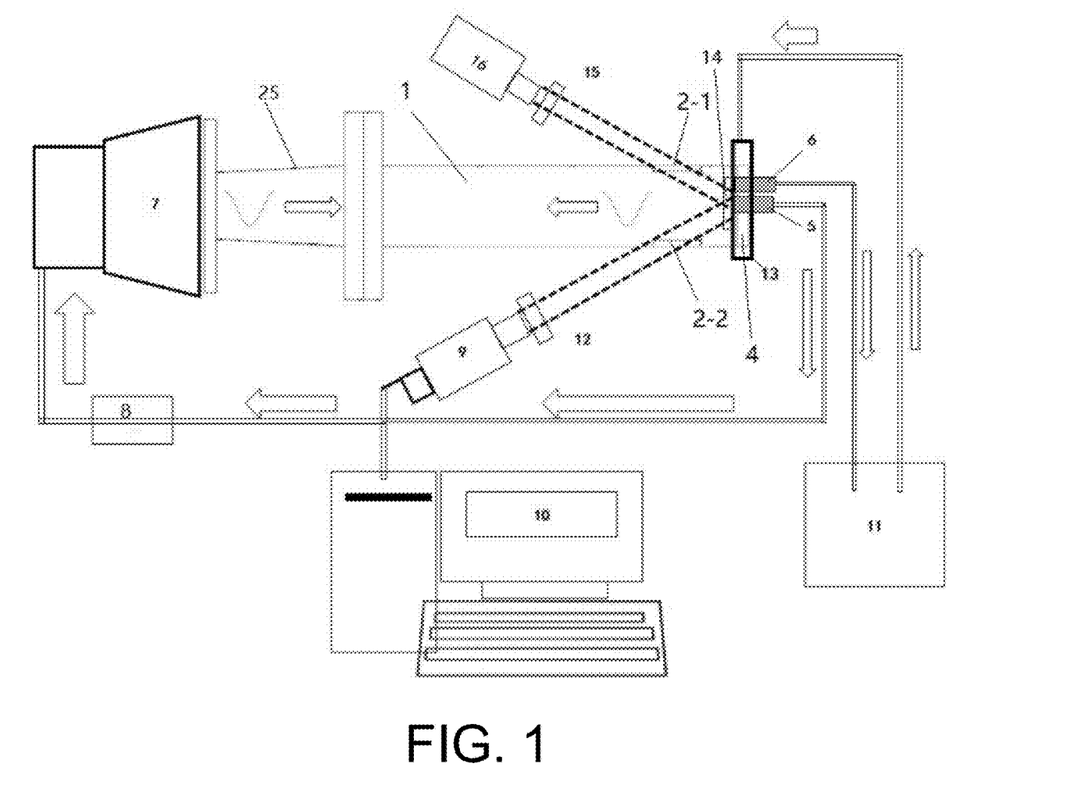
FIG. 1 is a schematic structural diagram during a dynamic calibration in an embodiment of the present disclosure.

The sound source 7 is configured to provide a dynamic pressure in the form of a sound wave during dynamic calibration. In this embodiment, the sound source is a speaker.

The dynamic adapter 25 is configured for sealed connection between the sound source 7 and a front portion of the main body section 1 during a dynamic calibration mode of the dual-purpose calibration system. The main body section 1 and the dynamic adapter 25 form a standing wave tube with a total length that allows the sound wave emitted by the sound source 7 to form a standing wave in the standing wave tube.

Figure 2:
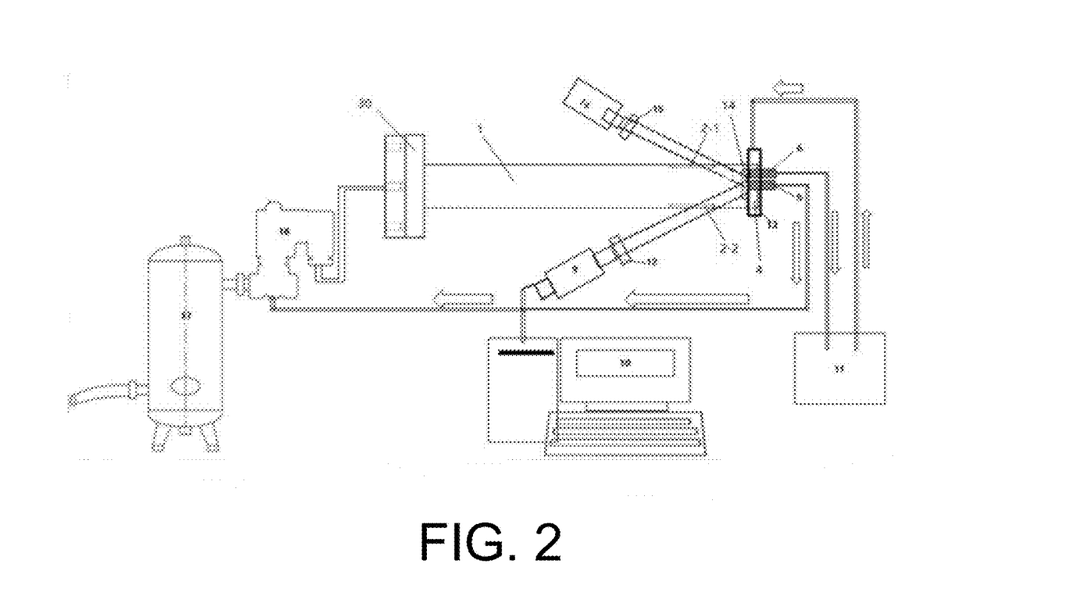
FIG. 2 is a schematic structural diagram during a static calibration in an embodiment of the present disclosure.

The gas source is configured to supply gas during a static calibration mode of the dual-purpose calibration system. In this embodiment, the gas source includes a gas storage tank and a vacuum tank 17.

Figure 6:
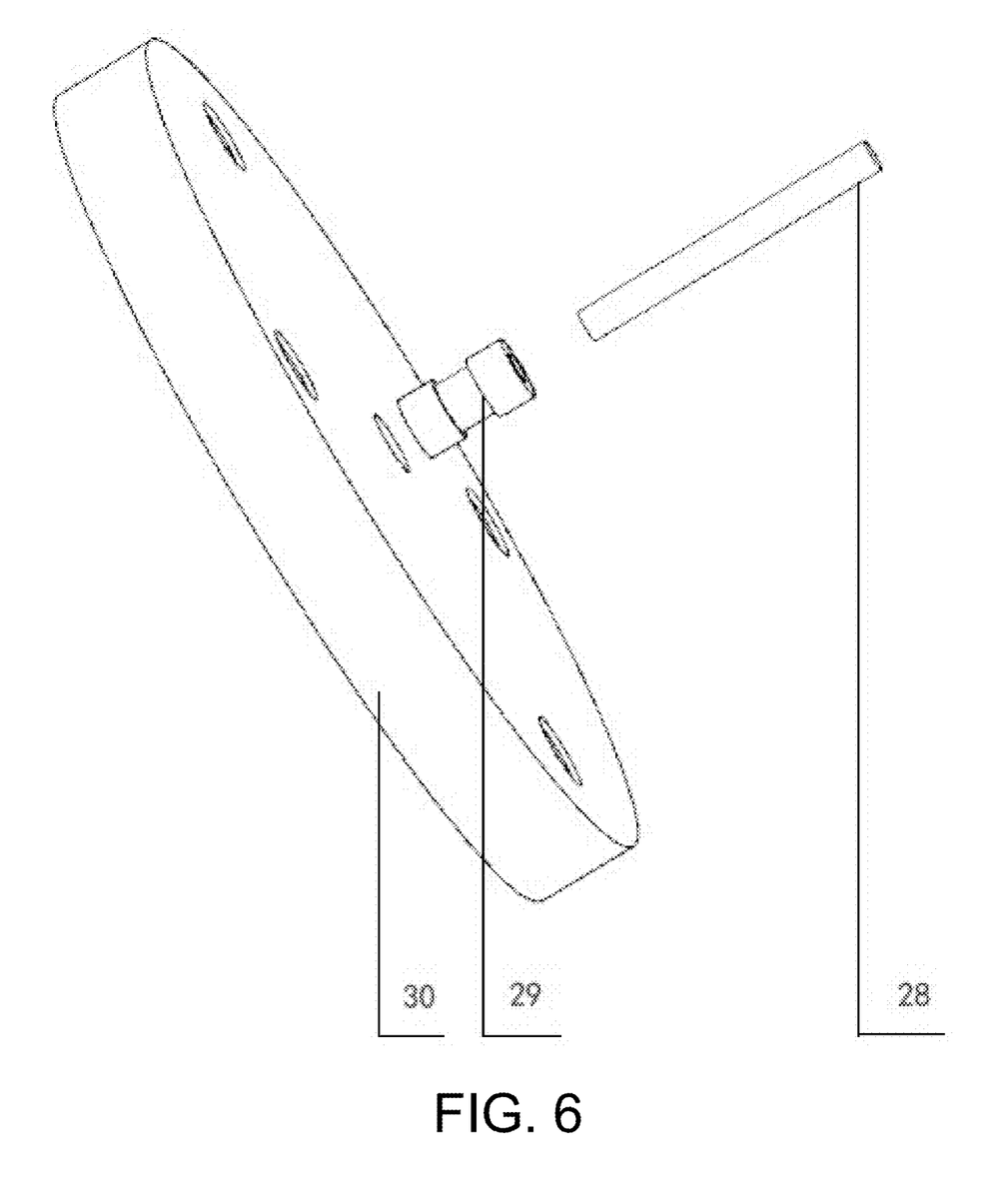
FIG. 6 is a schematic structural diagram of a static adapter.

The static adapter 30 is configured for sealed connection between the gas source and the front portion of the main body section 1 during the static calibration mode, so that the gas provided by the gas source is introduced into the dual-purpose calibration tube to form a pressure. In this embodiment, a solenoid valve 18 is arranged between the gas storage tank and the vacuum tank 17, and the static adapter 30.

The laser source 16 is configured to emit laser during the dynamic calibration mode and the static calibration mode, and irradiate the laser on the calibration sample 14 through the first transparent windows 2-1, so that the optical pressure sensitive paint on the calibration sample 14 generates excited light. A laser source filter 15 is arranged between the laser source 16 and the first transparent window 2-1.

The photoelectric conversion unit 9 is configured to receive the excited light from the second transparent window 2-2 during dynamic calibration and static calibration respectively, and convert the excited light into an electrical signal. In this embodiment, the photoelectric conversion unit 9 is a photomultiplier tube. A photoelectric conversion unit filter 12 (photomultiplier tube filter in this embodiment) is arranged between the photomultiplier tube and the second transparent window 2-2, for filtering out light sources other than the excited light.

The controller is configured to acquire a real-time pressure in the dual-purpose calibration tube through the pressure transducer 5, identify an intensity of the excited light of the optical pressure sensitive paint through the photoelectric conversion unit 9, control change of the frequency and amplitude of the sound source 7 and the heating degree of the heating device 13 during the dynamic calibration mode of the dual-purpose calibration system, and controls the amount of gas provided by the gas source and the heating degree of the heating device 13 during the static calibration mode of the dual-purpose calibration system, to obtain the intensity of the excited light under different working conditions. In this embodiment, the controller is a computer 10, which implements heating control of the heating device 13 through a temperature controller 11, and determines whether heating has reached a target temperature based on the temperature acquired by the temperature transducer 6; and the computer 10 controls a gas filling volume by controlling the on-off of the solenoid valve 18, and determines whether gas filling has reached a target pressure based on a pressure collected by the pressure transducer 5.

Figure 7:
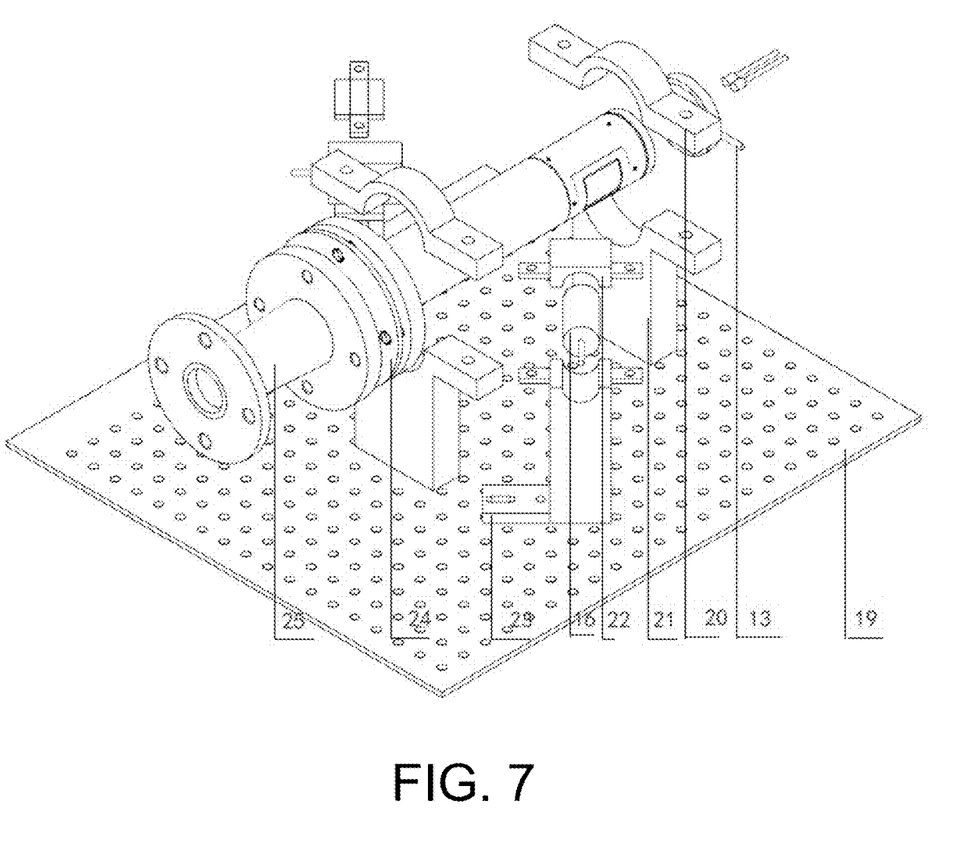
FIG. 7 is an overall assembly diagram for the dynamic calibration.
Figure 9:
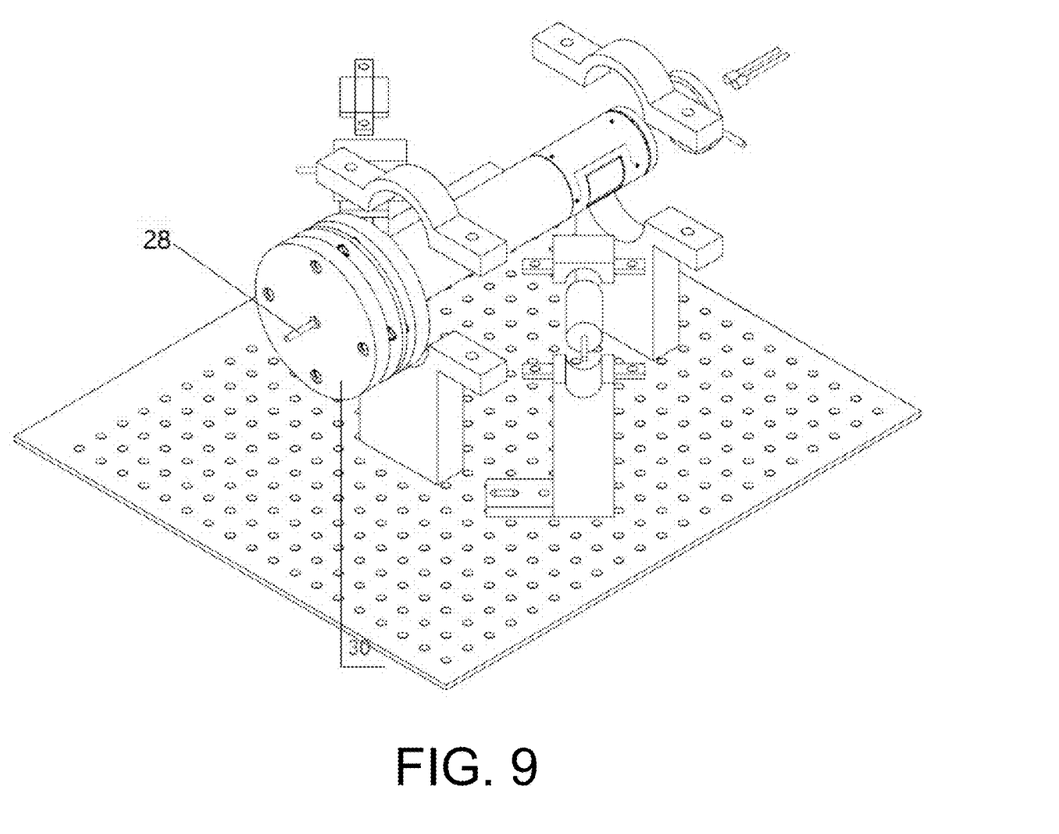
FIG. 9 is an overall assembly diagram for the static calibration.

The dual-purpose calibration tube, the laser source 16 and the photoelectric conversion unit 9 are respectively fixed on an optical precision vibration isolation platform 19.

In this embodiment, the cross section of the main body section is circular, and the main body section has a length of 318 mm, an inner diameter of 50 mm, a bottom outer diameter of 53 mm, a front outer diameter of 60 mm, and a fundamental frequency of 400 Hz; and a length of the dynamic adapter is 107 mm, a diameter of an end of the dynamic adapter connected to the sound source is 40 mm, and a diameter of an end of the dynamic adapter connected to the main body section is 50 mm. The basis for the size selection is described in the following.

a. A cutoff frequency is determined by an inner diameter of the calibration tube, and determines an upper limit of the frequency response of the calibration system and the degree of influence of high-order clutter, namely, the higher a cutoff frequency is, the better the performance of calibration system is. Compared with a cutoff frequency formula $$f_c = \frac{c}{2l_1}, l_1 = \max(l_x, l_y)$$

of a rectangular cross section, wherein a sound velocity c=340 m/s, and $l_x$ and $l_y$ represent the length of a rectangular cross section in the x direction and the y direction respectively, a cutoff frequency formula of a circular cross section in the case of polar axis symmetrical vibration of the sound source is $$f_c = 3.832 \frac{c}{2\pi a},$$

wherein a represents the radius of the circular cross section. Under the condition of the same cross-sectional area, a cutoff frequency of the circular cross section is higher than that of the rectangular cross section. Therefore, the cross section of the calibration tube is selected to be a circular cross section. According to the cutoff frequency formula of the circular cross section of the calibration tube and a standard part size of a pipeline with a circular cross section, the inner diameter of the main body section is selected to be 50 mm.

b. An operating frequency f of the calibration tube should be an integer multiple of the fundamental frequency f' of the standing wave. According to a standing wave resonance condition $$f' = f/n = \frac{c}{2l}, (n = 1, 2, 3, \ldots)$$

and the principle of minimizing acoustic wave energy loss, a designed fundamental frequency of the calibration tube is selected to be 400 Hz, and an overall length l of the standing wave tube can be calculated to be 425 mm based on the fundamental frequency f' of 400 Hz. If other magnitude of the fundamental frequency is selected, such as 200 Hz, the calculated overall length is too great, and the loss is large. If the fundamental frequency is selected to be 800 Hz, the calculated overall length is too small, and it is not easy to place other components to form a system such as an optical path.

c. To reduce the influence of a higher-order wave on a plane standing wave and strengthen the energy of a first-order plane wave, according to a zero noise reduction formula $$f_1 = n\frac{c}{2l_2}, (n = 1, 2, 3, \ldots)$$

in the principle of pipeline energy loss, wherein $f_1$ is a pass frequency, and $l_2$ is the length of the dynamic adapter 25. When an operating frequency is an integer multiple of the pass frequency, there will not be any pipeline energy loss. Considering that the dynamic adapter with a length of about ⅓ of the overall length is appropriate, let $f_1$ be 1600 Hz, and the length of the dynamic adapter 25 is calculated and designed to be 107 mm. To match an inner diameter of a loudspeaker, an inner diameter of a small end of the dynamic adapter 25 is designed to be 40 mm; to match the size of the main body section of the calibration tube, an inner diameter of a large end of an expansion section is designed to be 50 mm.

The length of the main body section 1 is 318 mm, and the inner diameter of the main body section is 50 mm. The main body section has an outer diameter in a stepped design, the outer diameter on a side close to the bottom cap being set to 53 mm. The structural and size design is mainly to fit with the window cover ring to fasten the quartz glass window. The outer diameter on a side close to the dynamic adapter 25 is set to 60 mm. Two rows of threaded holes (4 threaded holes in each row, with 90° between two threaded holes) are arranged on the side with an outer diameter of 53 mm, to fit with the window cover ring.

The bottom cap 4 is fit to the main body section 1 by using the close fit between internal and external threads. Two transducer lead holes on the bottom cap 4 are provided with internal threads, and the pressure transducer 5 with an external thread and the temperature transducer 6 with an external thread are tightly connected with the lead holes on the bottom cap 4 through the threads to achieve a sealing effect.

During assemble, the small crescent 2.2 of the transparent window is inserted into the window hole of the main body section 1 first, and then the window cover ring 3 is installed, so that the transparent window is embedded between the main body section 1 and the window cover ring 3. The threaded holes on the main body section 1 are aligned with those on the window cover ring 3, and bolts are screwed so that the main body section 1, the transparent window and the window cover ring 3 come into close fit with one another. Due to the structural and size design, the sealing effect can be achieved at that time.

Considering that the dimensional change of the inner diameter of the main body section 1 can influence the standing wave quality, to maintain the consistency of the overall inner diameter of the main body section 1 and the small crescent 2.2, an inner diameter of the small crescent 2.2 is the same as the inner diameter of the main body section 1. Other dimensions of the small crescent 2.2 inserted into the main body section are same as the dimensions of the window hole of the main body section 1 (the actual machining error should be +0 to +1 mm, with interference fit by means of friction or the like to achieve a completely sealed effect).

The large crescent 2.1 and the small crescent 2.2 are integrally processed (into one piece), and have an outer diameter equal to an inner diameter of the window cover ring. There are two reasons for this size design: 1. Air tightness is ensured. In a static working mode, if there is still gas flowing out from a clearance between the small crescent 2.2 and the window hole of the main body section 1, the large crescent 2.1 can be used for sealing (because the circumferential and axial dimensions of the large crescent 2.1 are larger than the dimensions of the window hole on the main body section 1; that is, the window hole can be completely covered). 2. The transparent window can be sandwiched between the main body section 1 and the window cover ring 3. The inner diameter of the window cover ring 3 is equal to an outer diameter of the large crescent, and an outer diameter of the window cover ring is 60 mm. The circumferential and axial dimensions of the cover ring hole of the window cover ring 3 are equal to the dimensions of the window hole on the main body section. Actual assembly process is as follows: the small crescent 2.2 is inserted into the window hole of the main body section 1 by interference fit, so that the large crescent 2.1 covers the main body section 1 at that time. The window cover ring 3 is installed axially from a side of the bottom cap 4, so that the transparent window can be sandwiched between the main body section 1 and the window cover ring 3. At that time, the window cover ring 3 is rotated circumferentially so that the eight threaded holes on the window cover are respectively aligned with the eight threaded holes on the main body section 1 (considering that the interior of the main body section 1 needs to be smooth, the threaded holes on the main body section 1 are blind holes; that is, they are not completely through), and the main body section 1 and the window cover ring 4 are fixed by bolts, so that the transparent window is sandwiched therebetween at that time. As the position of the cover ring hole on the window cover ring 3 is considered in the design, when the eight threaded holes are aligned, the cover ring hole of the window cover ring 3 is also aligned with the window hole of the main body section 1 to ensure the unblocked light path.

Figure 8:
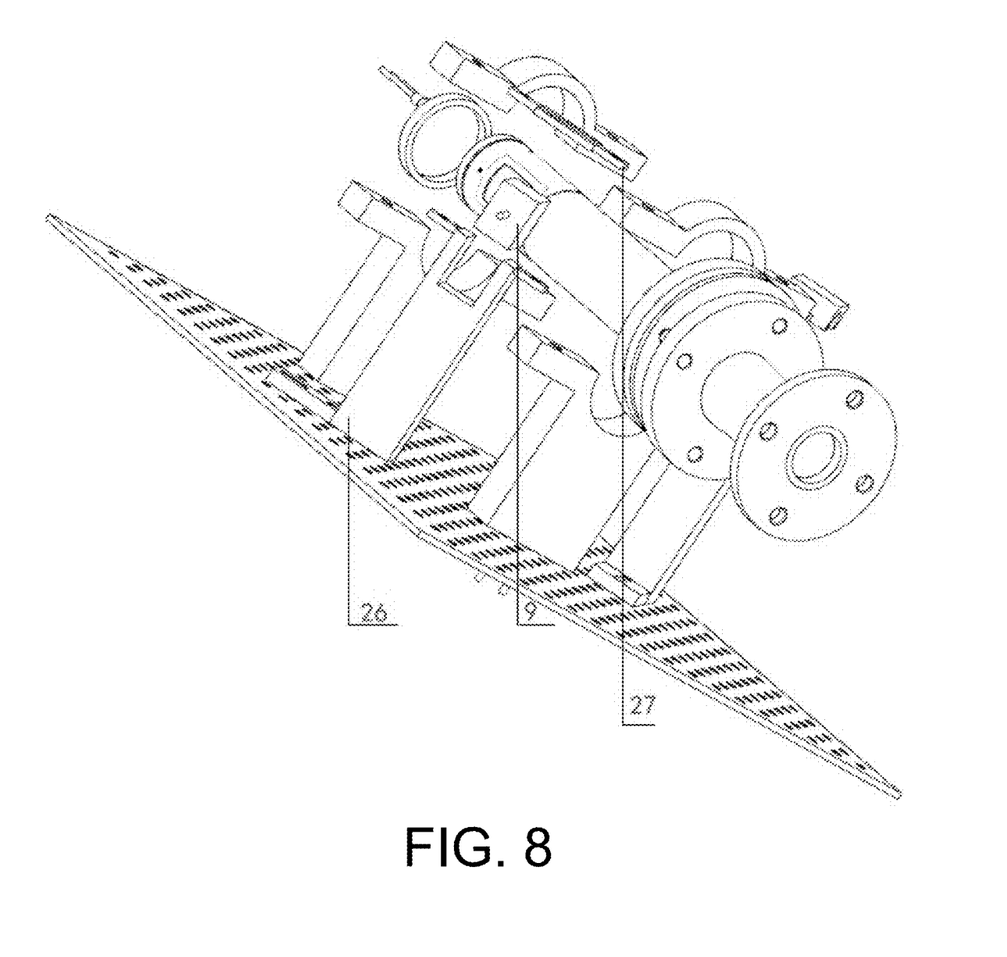
FIG. 8 is a view of FIG. 7 at another angle.

Specific structural design and connection of a sinusoidal dynamic calibration mode are as follows:

1. Selection and Connection of Components Connected with the Dual-Purpose Calibration Tube A main body section support frame upper part 20 is connected with a main body section support frame 21 by two bolts. Similarly, an adapter section support frame upper part is connected with an adapter section support frame by two bolts. The dual-purpose calibration tube is supported and fixed by the two support frames, one in the front and the other in the rear. The two support frames are connected to the optical precision vibration isolation platform 19 through pins at the bottoms of the support frames and the platform holes. The optical precision vibration isolation platform 19 is a stainless steel platform with holes. This type of platform has good horizontality and can be connected with other components through holes on the platform to achieve an extremely precise positioning function. The heating device 13 is fastened to the vicinity of the optical pressure sensitive paint of the main body section at the rear end of the standing wave tube through bolts of the heating device. The heating device 13 is selected to be an annular heating ring. This type of heating ring can directly sleeve the dual-purpose calibration tube, thereby avoiding the connection problem between other types of heating plates and the dual-purpose calibration tube.

2. Selection and Fixation of Laser Source Related Components

The laser source 16 is selected to be an ultraviolet laser source, and the waveband of light emitted by the laser source can just excite the optical pressure sensitive paint and cause it to generate excited light. The laser source 16 is fixed in position by a laser source support frame 23 and a laser source support frame upper part 22. The laser source support frame 23 is fixed to the laser source support frame upper part 22 by two bolts. The laser source support frame 23 is connected to the optical precision vibration isolation platform 19 by two bolts.

3. Fixation of the Photomultiplier Tube

The photomultiplier tube (PMT) is fixed in position by a photoelectric conversion unit support frame (photomultiplier tube support frame in this embodiment) 26 and a photoelectric conversion unit support frame upper part (photomultiplier tube support frame upper part in this embodiment) 27. The photomultiplier tube support frame 26 is fixed to the photomultiplier tube support frame upper part 27 by two bolts. The photomultiplier tube support frame 26 is fixed to the optical precision vibration isolation platform 19 by two bolts.

Structural design and connection in the static calibration mode are as follows:

Four threaded holes are distributed evenly in the circumferential direction of the static adapter 30. The positions and sizes of the four threaded holes are same as those of flange threaded holes of the main body section to facilitate connection with the main body section. A hole with a diameter of 10 mm is formed in the middle of the static adapter 30, for inserting a gas inlet plug 29 with an outer diameter of 10 mm. A gas inlet pipe 28 can be hermetically plugged into the static adapter 30 through the gas inlet plug 29.

The static adapter 30 in the static calibration mode is connected with the main body section 1 by bolts; the gas inlet pipe 28 is connected to the solenoid valve 18; the solenoid valve 18 is connected to the gas source; and the solenoid valve is controlled by the computer 10.

The present disclosure also provides a calibration method implemented by using the dual-purpose optical pressure sensitive paint calibration system, including: the positional relationship between the laser source and the dual-purpose calibration tube, and the positional relationship between the photoelectric conversion unit and the dual-purpose calibration tube are adjusted, respectively, so that the laser emitted by the laser source is irradiated on the calibration sample through one of the transparent windows, and the optical pressure sensitive paint on the calibration sample generates excited light; and the photoelectric conversion unit receives the excited light from the other transparent window. Regardless of dynamic calibration or static calibration, the aforementioned positional relationship only needs to be adjusted once overall, and there is no need to perform multiple light alignment operations. The operation is simple, and much experimental time is saved.

During dynamic calibration, the controller changes the frequency and amplitude of the sound source and the heating degree of the heating device to acquire the intensity of the excited light under different working condition combinations, and compares results obtained by the photoelectric conversion unit and the pressure transducer at different sound source frequencies and temperatures to achieve dynamic calibration of optical pressure sensitive paint.

During static calibration, the controller controls the amount of gas provided by the gas source and the heating degree of the heating device to obtain the intensity of the excited light under different working conditions, and compares results obtained by the photoelectric conversion unit and the pressure transducer at different pressures and temperatures to achieve static calibration of optical pressure sensitive paint.

Switching is implemented between dynamic calibration and static calibration: changing between the dynamic adapter and static adapter, and setting the sound source or gas source corresponding to the dynamic adapter and static adapter.

Specifically, in the sinusoidal dynamic calibration mode:

1. The sound source 7 is connected to the main body section 1 through the dynamic adapter 25, and the sound source 7 is connected to the computer 10 through a power amplifier 8. A sound card of the computer can transmit a signal of a specific frequency to a loudspeaker of the sound source through the power amplifier 8, and can control the signal magnitude of the loudspeaker of the sound source 7 through the power amplifier 8.

The UV laser source is connected to a control power supply, and then the control power supply is connected to a DC regulated power supply. The intensity of the UV laser source can be changed by changing the magnitude of a current of the control power supply.

The photomultiplier tube is connected to the DC regulated power supply for power supply, and then its signal output is connected to a data acquisition card for data acquisition. A filter is installed in front of the photomultiplier tube to filter out light sources other than the excited light of the optical pressure sensitive paint.

The pressure transducer 5 is fixed to the bottom cap 4 to measure the pressure change inside the standing wave tube. The pressure transducer 5 is connected to the data acquisition card for acquiring the dynamic pressure change inside the standing wave tube.

The temperature transducer 6 is connected to the bottom cap 4 through threads to measure the temperature of the optical pressure sensitive paint. A signal output of the temperature transducer 6 is connected to the temperature controller 11 to provide a temperature signal input to the temperature controller 11. The heating device 13 sleeves the bottom cap 4 to change the temperature of the optical pressure sensitive paint. The power source of the heating device 13 is connected to the temperature controller 11. A signal input of the temperature controller 11 is connected to the temperature transducer 6, and a signal output of the temperature controller is connected to the heating device 13. After the target temperature is set, the temperature controller 11 can implement real-time control of the temperature through an internal relay. The temperature control system can be formed by the temperature transducer 6, the temperature controller 11, the heating device 13 and other structures.

2. The computer 10 and the temperature controller 11 are turned on, the temperature transducer 6 and the heating device 13 are connected thereto, the target temperature SV is set, and observation is performed to determine whether an actual temperature PV reaches the target temperature.

3. The power amplifier 8 is turned on. The computer 10 outputs a sinusoidal signal to the sound source and controls the sound source 7 to emit a sinusoidal signal with a forward traveling wave. When the forward traveling wave is transmitted to the bottom cap 4 on the right side of the standing wave tube, it is reflected to form a reflected wave. The forward traveling wave and the reflected wave form a standing wave at that time.

4. The pressure fluctuation in the tube is obtained by the pressure transducer 5. The excited light of the optical pressure sensitive paint is obtained through a signal transmitted back to the computer 10 by the photomultiplier tube. The excited light is generated with different frequencies and amplitudes according to the pressure fluctuation of the standing wave.

5. The frequency and amplitude of the sound source and the temperature of the temperature controller are changed so that data acquisition under different working condition combinations can be achieved.

6. Results obtained by the photomultiplier tube and the transducers at different frequencies, amplitudes and temperatures are compared to achieve dynamic calibration of the optical pressure sensitive paint.

In a static calibration mode:

1. The dynamic adapter 25 and a seal gasket 24 are removed and replaced with the static adapter 30 installed with the gas inlet plug 29 and a static gasket. The static adapter 30 is connected to the solenoid valve 18 through the gas inlet pipe 28, and the solenoid valve 18 is connected to the gas source through a gas introduction pipeline.

2. The computer 10 and the temperature controller 11 are turned on, the temperature transducer 6 and the heating device 13 are connected thereto, the target temperature SV is set, and observation is performed to determine whether an actual temperature PV reaches the target temperature.

3. The solenoid valve control software is enabled. A required pressure is input, an actual pressure value in the tube is obtained by the pressure transducer 5, and the real-time on-off of a gas inlet passage is controlled by the solenoid valve 18 to form a real-time negative feedback regulation mechanism.

4. The excited light of the optical pressure sensitive paint is obtained through a signal transmitted back to the computer 10 by the photomultiplier tube. The excited light is generated with different intensities according to the static pressure in the tube.

5. The pressure in the tube is changed through the solenoid valve 18 and the temperature in the tube is changed through the temperature controller 11 to obtain data under different working conditions.

6. Results obtained by the photomultiplier tube and pressure transducer 5 at different pressures and temperatures are compared to achieve static calibration of the optical pressure sensitive paint.

Choice of Fittings in the Two Modes:

Fittings in the sinusoidal dynamic calibration mode mainly include a high-quality speaker. High-quality means that it can guarantee high amplitude stability at high frequencies. Fittings in the static calibration mode mainly include a high-precision solenoid valve and a gas source.

In the present disclosure, loose sealing is liable to occur in the places of the transparent windows, leads on the bottom cap, flange connections, and the gas inlet pipe of the static adapter. The sealing at the transparent windows can be ensured by a structure and size in a new design; the sealing at the leads on the bottom cap can be ensured by thread connection; the sealing at the flange connections can be ensured by threads and gaskets; and the sealing at the gas inlet pipe of the static adapter can be ensured by the gas inlet plug. Therefore, sealing can be ensured in both modes.

Figure 10:
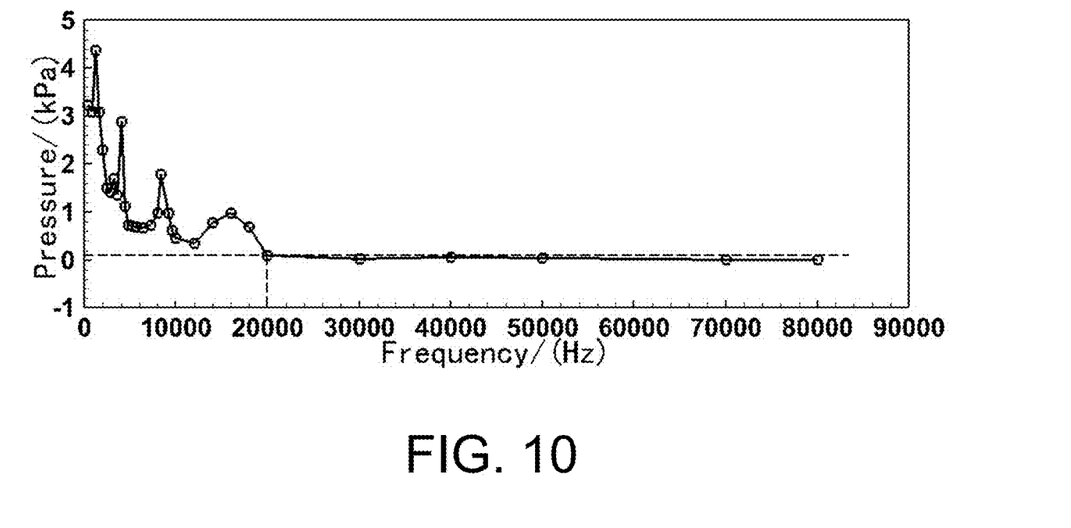
FIG. 10 shows a resonance spectrum of a calibration system.
Figure 11:
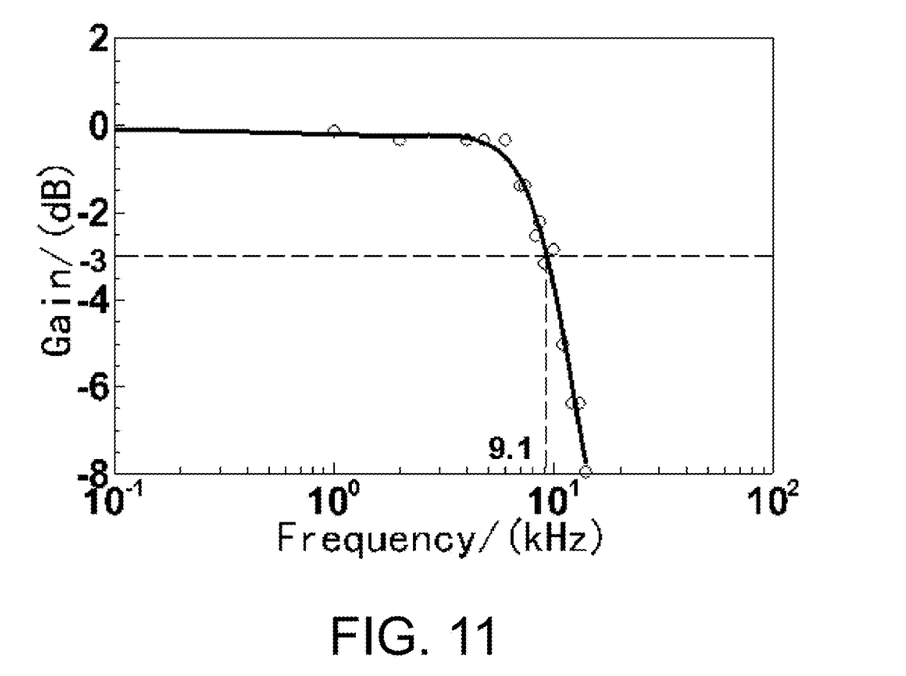
FIG. 11 is a curve diagram of a dynamic response frequency characteristic in an embodiment of the present disclosure.
Figure 12:
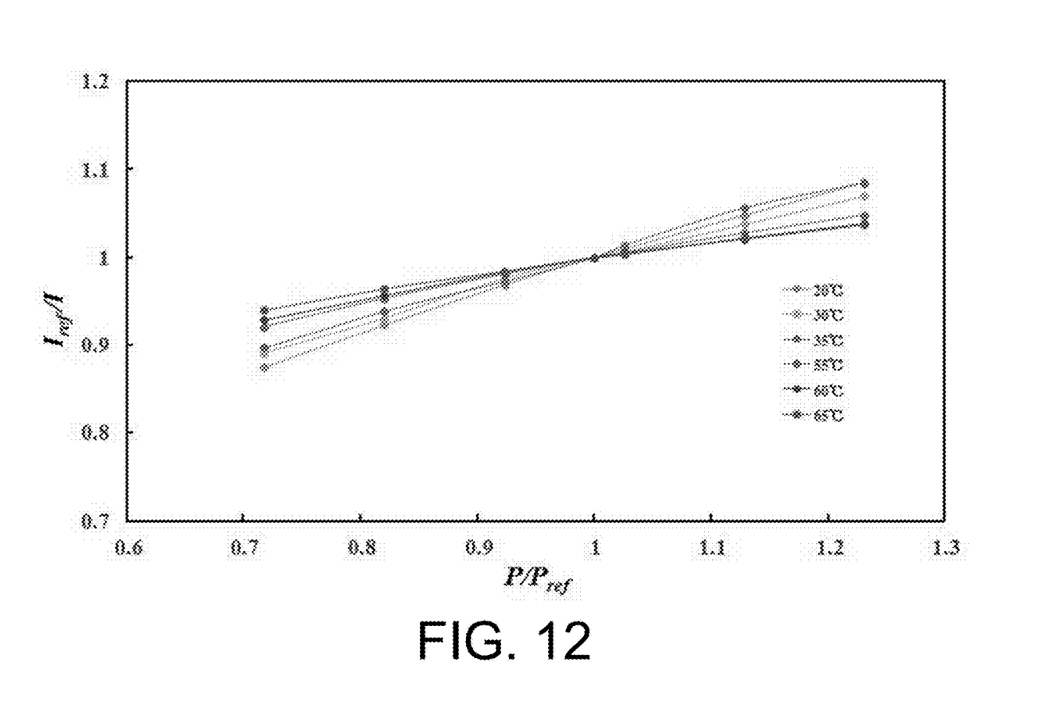
FIG. 12 is a curve diagram of static calibration in an embodiment of the present disclosure.
Figure 13:
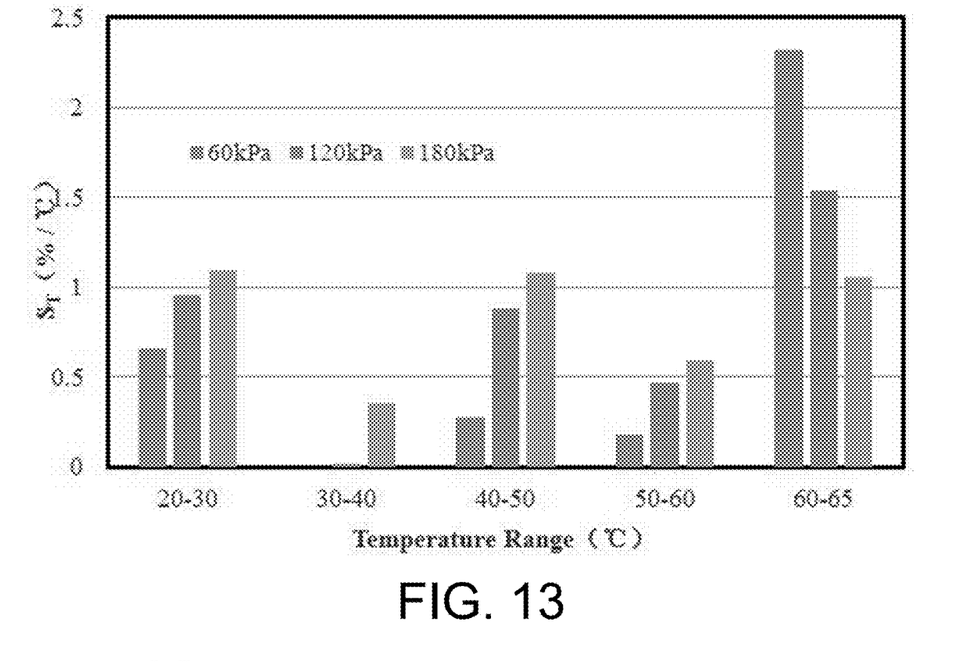
FIG. 13 is a diagram of static temperature sensitivity in an embodiment of the present disclosure.
Figure 14:
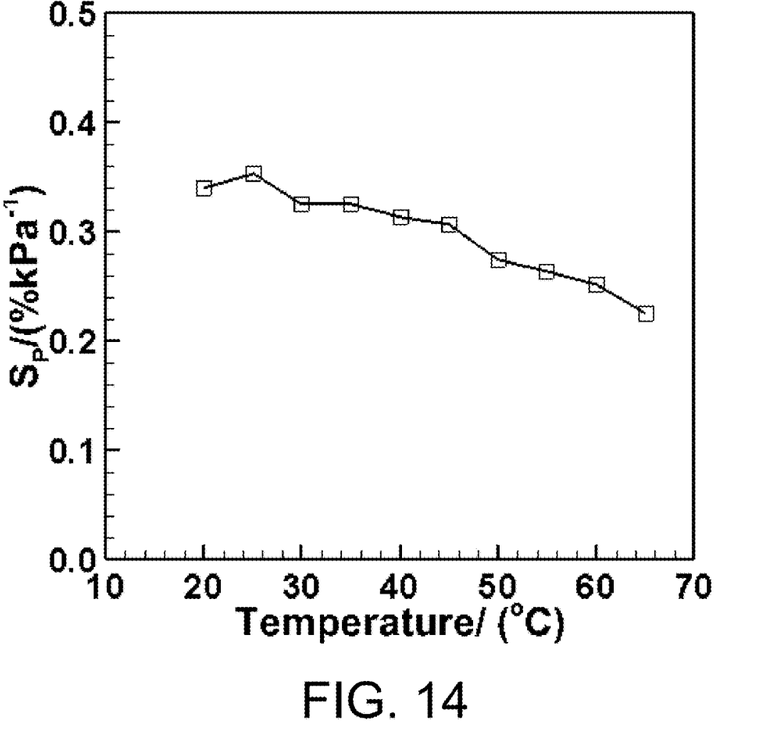
FIG. 14 is a diagram of static pressure sensitivity in an embodiment of the present disclosure.

FIG. 10 shows a resonance spectrum of the calibration system at multiple operating frequencies. Experimental results show that the calibration system can guarantee a dynamic pressure greater than 100 Pa when the frequency is lower than 20 kHz, so it can calibrate most transducers and optical pressure sensitive paints. FIG. 11 shows a result of the dynamic response frequency characteristic of an optical pressure sensitive paint by using the dynamic mode of the calibration system. The experimental result shows that the maximum frequency of the dynamic response of the optical pressure sensitive paint is 9.1 kHz; that is, when the dynamic frequency is higher than 9.1 kHz, the optical pressure sensitive paint cannot follow dynamic pressure changes, so the dynamic calibration mode can implement calibration of the dynamic response frequency characteristic of most transducers and paints. FIG. 12 shows a result of static calibration of an optical pressure sensitive paint by using the static mode of the calibration system. The experimental result shows that the calibration system can achieve static calibration of the optical pressure sensitive paint at different temperatures. FIGS. 13 and 14 respectively show measurement results of the temperature sensitivity and pressure sensitivity of an optical pressure sensitive paint by using the static mode of the calibration system. The experimental results show that the calibration system can achieve calibration of other static characteristic parameters of the optical pressure sensitive paint. In this embodiment, the material of the main body section and the dynamic adapter is stainless steel, and the material of the transparent windows is quartz glass.

The present disclosure can achieve static and sinusoidal dynamic dual-purpose measurement, and can implement the two measurements on one set of equipment, so there is no need to design and purchase multiple types of equipment. In terms of static calibration, a static calibration relation, repeatability, hysteresis, sensitivity and other static parameters of the pressure sensitive paint can be obtained. In terms of dynamic calibration, the inner diameter of the main body section, the length of the dynamic adapter section, the overall length of the dynamic standing wave tube, and the like are designed after rigorous theoretical calculations and experimental verifications. There is a high frequency response measurement range under the sinusoidal dynamic calibration mode. By using the self-designed temperature control system, the temperature of the optical pressure sensitive paint can be accurately controlled during dynamic calibration, and the sensitivity of the dynamic response characteristics (frequency response characteristic, phase characteristic) of the optical pressure sensitive paint to temperature can be studied. None of the static and sinusoidal dynamic modes requires multiple light alignment operations. Only one light alignment operation is required, and subsequent light alignment operations can be omitted. Furthermore, both the static and sinusoidal dynamic modes are simple to operate without complicated operations, thereby saving a lot of experimental time.

The present disclosure has the advantages of a simple structure, convenient machining and strong anti-interference ability, and also can effectively reduce the experimental cost.

The above embodiments are only used for explaining the design ideas and characteristics of the present disclosure, and intended to enable those skilled in the art to understand the contents of the present disclosure and carry them out accordingly, and the protection scope of the present disclosure is not limited to the above embodiments. Therefore, all equivalent changes or modifications made according to the principles and design ideas disclosed in the present disclosure are within the protection scope of the present disclosure.

What is claimed is:

1. A dual-purpose calibration system for an optical pressure sensitive paint considering static and sinusoidal pressure changes, comprising:

a dual-purpose calibration tube, comprising a hollow tubular main body section, which is arranged at the bottom with a bottom cap in sealed connection with the hollow tubular main body section, the bottom cap being provided with a calibration sample located inside the hollow tubular main body section, the calibration sample being coated with an optical pressure sensitive paint, the bottom cap being also provided with a pressure transducer for detecting the pressure in the hollow tubular main body section and a temperature transducer for measuring the temperature of the optical pressure sensitive paint, and the bottom cap being sleeved with a heating device outside, wherein the hollow tubular main body section is provided with two transparent windows laterally;

a sound source, configured to provide a dynamic pressure in the form of a sound wave during a dynamic calibration mode;

a dynamic adapter, configured for sealed connection between the sound source and a front portion of the hollow tubular main body section during the dynamic calibration mode, the hollow tubular main body section and the dynamic adapter forming a standing wave tube with a total length that allows the sound wave emitted by the sound source to form a standing wave in the standing wave tube;

a gas source, configured to supply gas during a static calibration mode;

a static adapter, configured for a sealed connection between the gas source and the front portion of the hollow tubular main body section during the static calibration mode, so that the gas provided by the gas source is introduced into the dual-purpose calibration tube to form a pressure;

a laser source, configured to emit a laser during the dynamic calibration mode and the static calibration mode, and irradiate the laser on the calibration sample through one of the transparent windows, so that the optical pressure sensitive paint on the calibration sample generates an excited light;

a photoelectric conversion unit, configured to receive the excited light from the other transparent window during the dynamic calibration mode and the static calibration mode respectively, and convert the excited light into an electrical signal; and a controller, configured to acquire a real-time pressure in the dual-purpose calibration tube through the pressure transducer, identify an intensity of the excited light of the optical pressure sensitive paint through the photoelectric conversion unit, control a change of frequency of the sound source and a heating degree of the heating device during the dynamic calibration mode, and control an amount of gas provided by the gas source and the heating degree of the heating device during the static calibration mode, to obtain the intensity of the excited light under different working conditions.

2. The dual-purpose optical pressure sensitive paint calibration system according to claim 1, wherein the transparent windows are in a double-crescent shape, and the hollow tubular main body section is sleeved with a window cover ring outside, wherein the double-crescent shape is composed of an outer large crescent and an inner small crescent which are integrally processed into one piece, the small crescent is in interference fit with a window hole on the hollow tubular main body section, and the large crescent is embedded between the hollow tubular main body section and the window cover ring for fixing the same, wherein the window cover ring is provided with a cover ring hole aligned with the window hole.

3. The dual-purpose optical pressure sensitive paint calibration system according to claim 1, wherein optical filters are arranged in an optical path between the laser source and the calibration sample, for filtering out light sources other than the laser, and in an optical path between the calibration sample and the photoelectric conversion unit, for filtering out light sources other than the excited light, respectively.

4. The dual-purpose optical pressure sensitive paint calibration system according to claim 1, wherein the dual-purpose calibration tube, the laser source and the photoelectric conversion unit are respectively fixed on an optical precision vibration isolation platform.

5. The dual-purpose optical pressure sensitive paint calibration system according to claim 1, wherein the photoelectric conversion unit is a photomultiplier tube.

6. The dual-purpose optical pressure sensitive paint calibration system according to claim 1, wherein the controller implements heating control of the heating device through a temperature controller, and determines whether heating has reached a target temperature based on the temperature acquired by the temperature transducer.

7. The dual-purpose optical pressure sensitive paint calibration system according to claim 1, wherein a solenoid valve is arranged in a gas path between the gas source and a static adapter, and the controller controls a gas filling volume by controlling the on-off of the solenoid valve, and determines whether gas filling has reached a target pressure based on a pressure collected by the pressure transducer.

8. The dual-purpose optical pressure sensitive paint calibration system according to claim 1, wherein a cross section of the hollow tubular main body section is circular in shape, and the hollow tubular main body section has a length of 318 mm, an inner diameter of 50 mm, a bottom outer diameter of 53 mm, a front outer diameter of 60 mm, and a fundamental frequency of 400 Hz, wherein a length of the dynamic adapter is 107 mm, a diameter of an end of the dynamic adapter connected to the sound source is 40 mm, and a diameter of an end of the dynamic adapter connected to the hollow tubular main body section is 50 mm.

9. A calibration method implemented by using the dual-purpose optical pressure sensitive paint calibration system of claim 1, comprising:

adjusting a positional relationship between the laser source and the dual-purpose calibration tube and a positional relationship between the photoelectric conversion unit and the dual-purpose calibration tube, respectively, so that the laser emitted by the laser source is irradiated on the calibration sample through one of the transparent windows, and the optical pressure sensitive paint on the calibration sample generates the excited light, wherein the photoelectric conversion unit receives the excited light from the other transparent window;

during a dynamic calibration, changing the frequency of the sound source and the heating degree of the heating device to acquire the intensity of the excited light under different working condition combinations and comparing results obtained by the photoelectric conversion unit and the pressure transducer at different sound source frequencies and temperatures to achieve the dynamic calibration of the optical pressure sensitive paint by the controller;

during a static calibration, controlling the amount of gas provided by the gas source and the heating degree of the heating device to obtain the intensity of the excited light under the different working conditions and comparing the results obtained by the photoelectric conversion unit and the pressure transducer at the different pressures and temperatures to achieve the static calibration of the optical pressure sensitive paint by the controller; and switching between the dynamic calibration and the static calibration comprising changing between the dynamic adapter and the static adapter, and setting the sound source corresponding to the dynamic adapter or setting the gas source corresponding to the static adapter.

* * * * *